United States Patent
Tsuchiya et al.

(10) Patent No.: US 10,572,781 B2
(45) Date of Patent: Feb. 25, 2020

(54) SUPPORT APPARATUS AND METHOD THEREOF

(71) Applicant: CANON KABUSHIKI KAISHA, Tokyo (JP)

(72) Inventors: Takaaki Tsuchiya, Inagi (JP); Hayato Koga, Kawasaki (JP); Kenji Taki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 15/087,011

(22) Filed: Mar. 31, 2016

(65) Prior Publication Data
US 2016/0292326 A1   Oct. 6, 2016

(30) Foreign Application Priority Data
Mar. 31, 2015  (JP) ................. 2015-073213

(51) Int. Cl.
*G03G 15/36* (2006.01)
*G06K 15/00* (2006.01)
*G06K 15/16* (2006.01)

(52) U.S. Cl.
CPC ........... *G06K 15/408* (2013.01); *G06K 15/16* (2013.01)

(58) Field of Classification Search
CPC .. G06K 15/408; G06K 15/16; G06K 15/4085; G06F 17/5018; G06F 2217/16
See application file for complete search history.

(56) References Cited

U.S. PATENT DOCUMENTS

| | | | | |
|---|---|---|---|---|
| 2002/0052723 | A1* | 5/2002 | Hashima | G06F 17/5009 703/7 |
| 2007/0083349 | A1* | 4/2007 | Kawakami | G06F 17/5009 703/7 |
| 2008/0253607 | A1* | 10/2008 | Miyamoto | B41J 2/2142 382/100 |

FOREIGN PATENT DOCUMENTS

| | | |
|---|---|---|
| JP | H11282825 A | 10/1999 |
| JP | 2002140372 A | 5/2002 |
| JP | 2006113725 A | 4/2006 |
| JP | 3886627 B2 | 2/2007 |
| JP | 4049925 B2 | 2/2008 |
| JP | 2010-072853 A | 4/2010 |
| JP | 5143028 B2 * | 2/2013 |
| JP | 2014225203 A | 12/2014 |
| JP | 2015014821 A | 1/2015 |

OTHER PUBLICATIONS

JP 5143028—Transaltion (Year: 2013).*

(Continued)

*Primary Examiner* — Brian W Wathen
*Assistant Examiner* — Abdou K Seye
(74) *Attorney, Agent, or Firm* — Carter, DeLuca & Farrell LLP

(57) ABSTRACT

A simulation of behavior of a recording medium, which moves a conveyance path of an image forming apparatus, is performed. A transport error of the recoding medium is obtained based on a result of the simulation, and the transport error indicates a deviation between an orientation of the recording medium moving the conveyance path in an ideal transport state in which there is no disturbance, and a simulated orientation of the recording medium. A geometric characteristic screen is generated to present the obtained transport error.

11 Claims, 14 Drawing Sheets

(56) References Cited

OTHER PUBLICATIONS

Katsuhito Sudoh et al., "Modeling a String from Observing the Real Object", Proceedings of 6th International Conference on Virtual Systems and Multimedia (VSMM2000), pp. 544-553, Oct. 2000.
Korean Office Action issued in corresponding Korean Patent Application No. 10-2016-0035051 and received Sep. 12, 2018, with English translation.
Japanese Office Action for application No. 2015073213 dated Jun. 21, 2019 with English translation.
Japanese Office Action dated Mar. 12, 2019 for application No. 2015-073213 with English translation.

* cited by examiner

FIG. 6

| PRINT MEDIUM REGISTRATION | |
|---|---|
| SIZE | TYPE |
| A4 | PRINT MEDIUM A |
| A3 | PRINT MEDIUM B |
| B5 | PRINT MEDIUM C |
| LTR | |

61 — SIZE list, 62 — TYPE list

OK  CANCEL

FIG. 7

TRANSPORT CONDITION SETTING

| ROLLER NUMBER | START OF DRIVING [s] | END OF DRIVING [s] | ROTATION SPEED [rps] |
|---|---|---|---|
| 1 | 0 | 0.5 | 5.0 |
| 2 | 0.5 | 1.0 | 8.0 |
| 3 | 2.5 | 3.7 | -8.0 |

OK  CANCEL

FIG. 10A
FIG. 10B
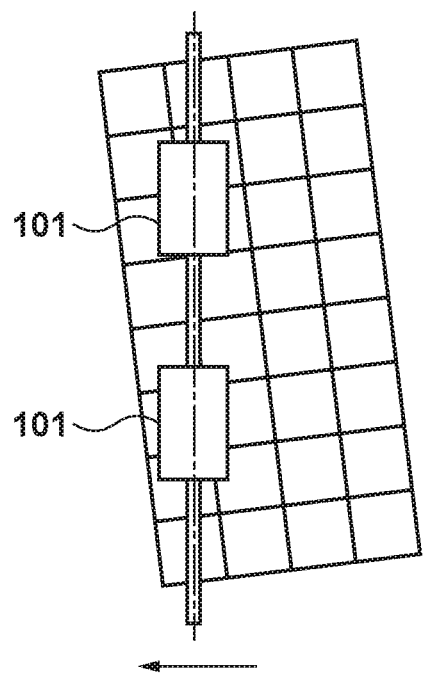
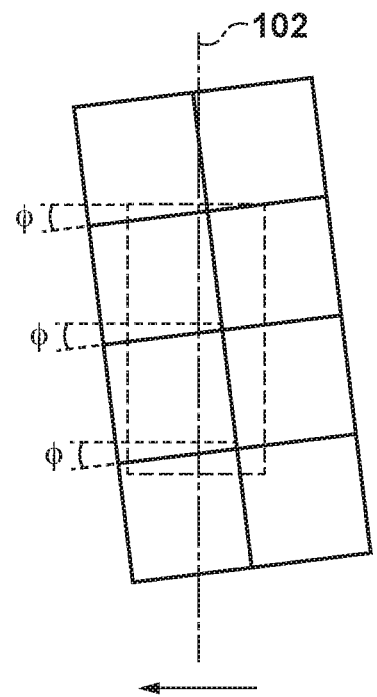

SUPPORT APPARATUS AND METHOD THEREOF

BACKGROUND OF THE INVENTION

Field of the Invention

The present invention relates to a technique of analyzing the behavior of a print medium transported through the conveyance path of an image forming apparatus or the like and supporting conveyance path design.

Description of the Related Art

When designing a print medium conveyance path in a printer, the functions of designed structures are examined under various conditions. This makes it possible to decrease workloads needed to manufacture and test prototypes and reduce the development period and cost. For this purpose, a design support system for simulating the behavior of paper in a conveyance path has been proposed. The design support system expresses paper by finite elements of the finite element method (FEM), determines the contact between the paper and a transport guide or feed rollers in the conveyance path, and numerically solves equations of motion, thereby evaluating the transport resistance or contact angle between the paper and the transport guide. In addition, a method of more simply expressing paper by a mass and a spring, thereby improving the calculation speed has been made open (for example, literature 1).

Literature 1: Katsuhito Sudan, "Modeling a String from Observing the Real Object", Proceedings of 6th International Conference on Virtual Systems and Multimedia (VSMM2000), pp. 544-553, 2000

To solve a motion of paper, the Euler method, Newmark $\beta$ method, Wilson $\theta$ method, and the like are known. According to these methods, equations of motion of paper discretely expressed by finite elements or a mass-spring system are formulated. The analysis time is divided into time steps each having a finite width, and numerical time integration for sequentially obtaining the acceleration, speed, and displacement that are unknowns is performed in each time step from time zero.

In the design support system, as a representative method of verifying simulation results, deformation behaviors of paper on animation display or graphic display is observed. The deformation state of paper can be grasped by the observation, and factors of design deficiencies such as paper caught on an uneven portion of the conveyance path, a folded corner of paper, and paper jam can effectively be identified.

Japanese Patent Laid-Open No. 2010-072853 proposes a method of effectively displaying behaviors of a portion (a tip of paper, or the like) under focus of an operator using 3D simulation display with analysis contents more complex than 2D simulation display, aiming at preventing oversight of design deficiencies and reducing a work load.

However, it is difficult to evaluate design problems (print accuracy and the like) to cope with high-quality printed products of recent demand only by observing behaviors of a portion under focus of the operator. In the conveyance path from paper feed to discharge, paper is simultaneously fastened by a large number of feed rollers. It is therefore impossible to evaluate a small tilt or horizontal deviation of paper only by observing simple animation display or paper track. In other words, it is impossible to quantitatively grasp how a slight transport deviation of a print medium changes and specify the location where an error occurs, and factors of the error.

The design support system can detect a failure on the path, for example, paper caught on the transport guide or paper stop caused by slip of feed rollers in a path with a large transport load. However, problems of a design are not limited to visually recognizable failures. Concerning print accuracy, a small transport error of paper poses a problem.

According to the above-described simulation technique, the information of the position, orientation, and speed of paper at a certain time can be obtained. However, the information of the position, orientation, and speed of paper is not enough to obtain geometric characteristics (tilt and horizontal deviation state of paper) throughout the paper path, which are necessary to evaluate errors in steps of 0.1 mm, and specify the factors of the errors.

SUMMARY OF THE INVENTION

In one aspect, a design support apparatus comprising: a simulation unit configured to perform a simulation of behavior of a recording medium which moves a conveyance path of an image forming apparatus; an obtaining unit configured to obtain a transport error of the recoding medium based on a result of the simulation, wherein the transport error indicates a deviation between an orientation of the recording medium moving the conveyance path in an ideal transport state in which there is no disturbance, and a simulated orientation of the recording medium; and a generation unit configured to generate a geometric characteristic screen to present the obtained transport error.

According to the aspect, it is possible to present the geometric characteristics of a print medium on a conveyance path.

Further features of the present invention will become apparent from the following description of exemplary embodiments with reference to the attached drawings.

BRIEF DESCRIPTION OF THE DRAWINGS

FIG. 6 is a view showing an example of a registration dialog box for a print medium.

FIG. 7 is a view showing an example of a setting dialog box for transport conditions of a feed roller.

FIGS. 10A and 10B are views for explaining calculation of a tilt amount

DESCRIPTION OF THE EMBODIMENTS

Hereinafter, a design support apparatus and a design support method according to an embodiment of the present invention will be described in detail with reference to the accompanying drawings. It should be noted that the following embodiments are not intended to limit the scope of the appended claims, and that not all the combinations of features described in the embodiments are necessarily essential to the solution of the present invention.

[Transport Deviation and Print Accuracy]

Figure 1A:
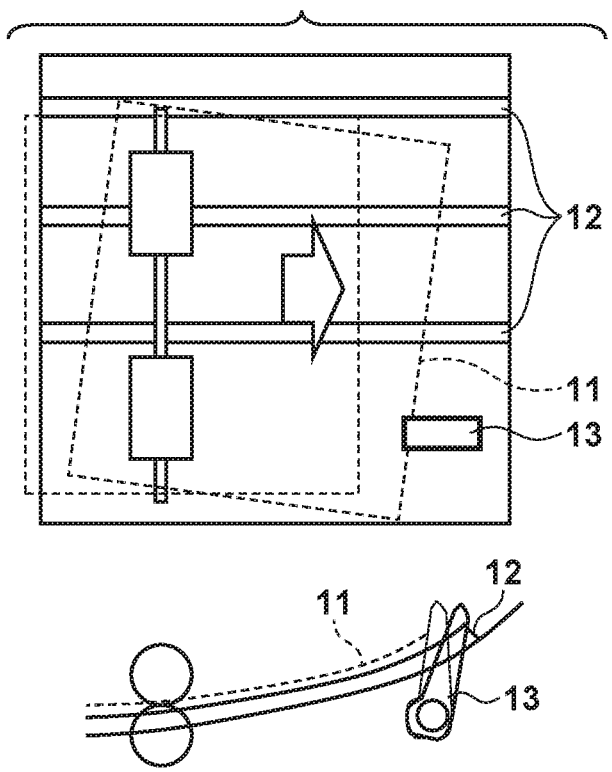
FIGS. 1A to 1C are views for explaining a state in which a transport deviation of a print medium occurs.

A state in which a transport deviation of a print medium is caused by a rib or mechanical component that exists on the conveyance path of an image forming apparatus will be described with reference to FIGS. 1A to 1C. FIG. 1A shows a state in which an uneven transport resistance is generated in a direction (the widthwise direction of a print medium 11) perpendicular to the transport direction, and the print medium 11 halfway through transport tilts. The factor of the unevenness of the transport resistance is a mechanical component such as a rib 12 or a contact sensor 13 on the conveyance path.

Figure 1B:
Figure 1C:
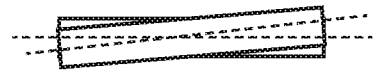

FIG. 1B shows a state in which a pressure is not evenly applied in the axial direction because of the influence of a variation in a pressure applied to a feed roller pair or flexure of a shaft. FIG. 1C shows a state in which the parallelism of the shafts of the feed roller pair is lost. With the variation factor shown in FIG. 1B or 1C, even a single feed roller causes a transport error such as a rotation or transport deviation of the print medium. When a transport error occurs, the position of an image transferred to the print medium deviates, and a decrease in print accuracy such as an image tilt with respect to the print medium or an image distortion occurs.

Figure 2A:
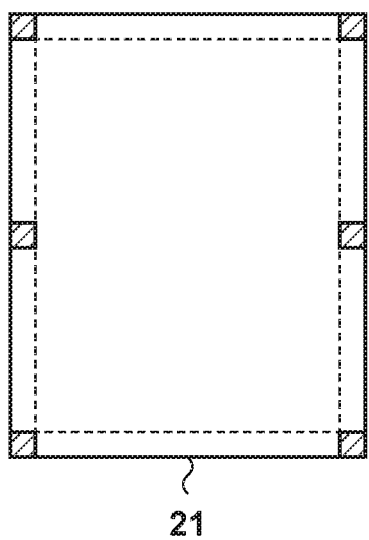
FIGS. 2A and 2B are views for explaining print accuracy.
Figure 2B:
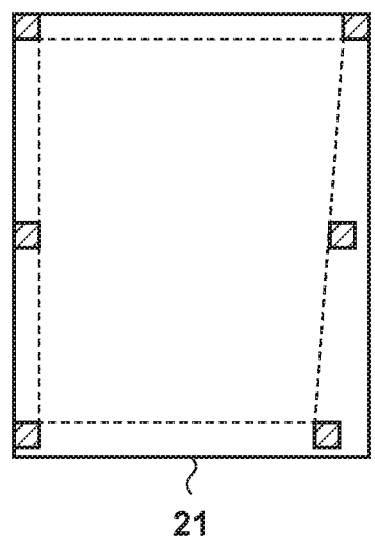

The print accuracy will be described with reference to FIGS. 2A and 2B. FIGS. 2A and 2B show patterns printed on a print medium 21. If printing is done as intended (ideal state), the patterns are printed near the apexes and sides of the print medium 21, as shown in FIG. 2A. If a transport error occurs, the pattern print positions deviate, as shown in FIG. 2B, and the image is distorted. A deviation of 0.1 mm from the ideal state is an important problem for the quality of a product. It is necessary to evaluate the transport error using simulations and exploit it to attain an optimum design.

[Arrangement of Apparatus]

Figure 3:
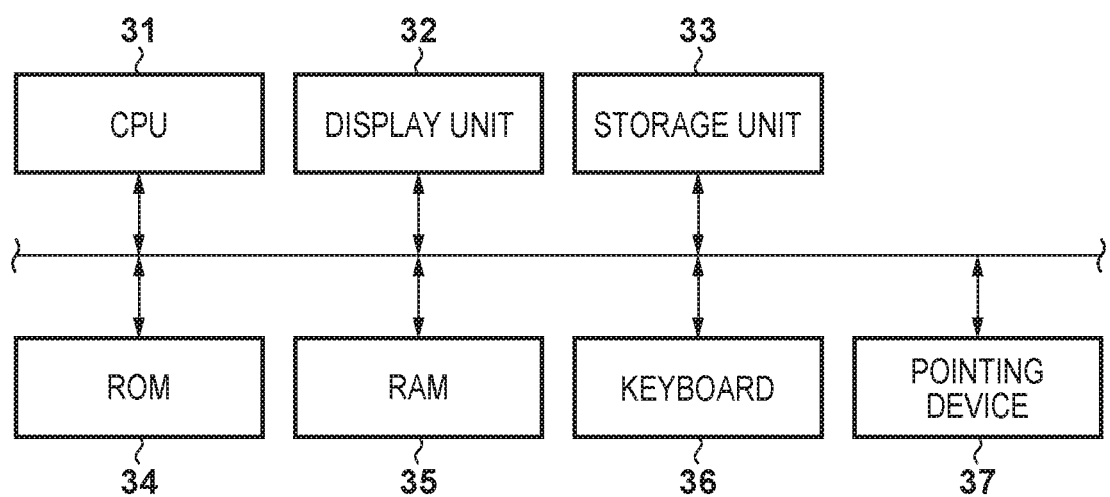
FIG. 3 is a block diagram showing the arrangement of an information processing apparatus that operates as a design support apparatus according to an embodiment.

The block diagram of FIG. 3 shows the arrangement of an information processing apparatus that operates as the design support apparatus according to the embodiment. A microprocessor (CPU) 31 executes an operating system (OS) or various kinds of programs stored in a read only memory (ROM) 34 or a storage unit 33 using a random access memory (RAM) 35 as a work memory, thereby controlling the entire information processing apparatus. The storage unit 33 is a hard disk drive (HDD) or solid state drive (SSD), and stores various kinds of programs including a design support program (to be described later), various kinds of data, information of an analysis result, and the like.

The CPU 31 displays a graphical user interface (GUI) on a display unit 32 in accordance with an executed program. The user inputs various conditions to the design support apparatus through the GUI by operating a keyboard 36 or a pointing device 37, and refers to an analysis result and the like displayed on the GUI.

Although not illustrated, the CPU 31 can access a server apparatus through a wired or wireless network and transmit/receive various kinds of programs or various kinds of data to/from the server apparatus. The CPU 31 can also access the database of the server apparatus.

The design support apparatus according to this embodiment is a computer that executes processing of simulating (to be simply referred to as "simulation" hereinafter) the behavior of a print medium transported on the conveyance path of an image forming apparatus. A simulation is implemented by defining the conveyance path and the print medium and calculating the motion of the print medium transported on the conveyance path. Definition of a conveyance path, a print medium, and a transport condition and processing of motion calculation will be described below. Note that the definition and processing are implemented when the CPU 31 executes the design support program.

[Outline of Design Support Program]

Figure 4:
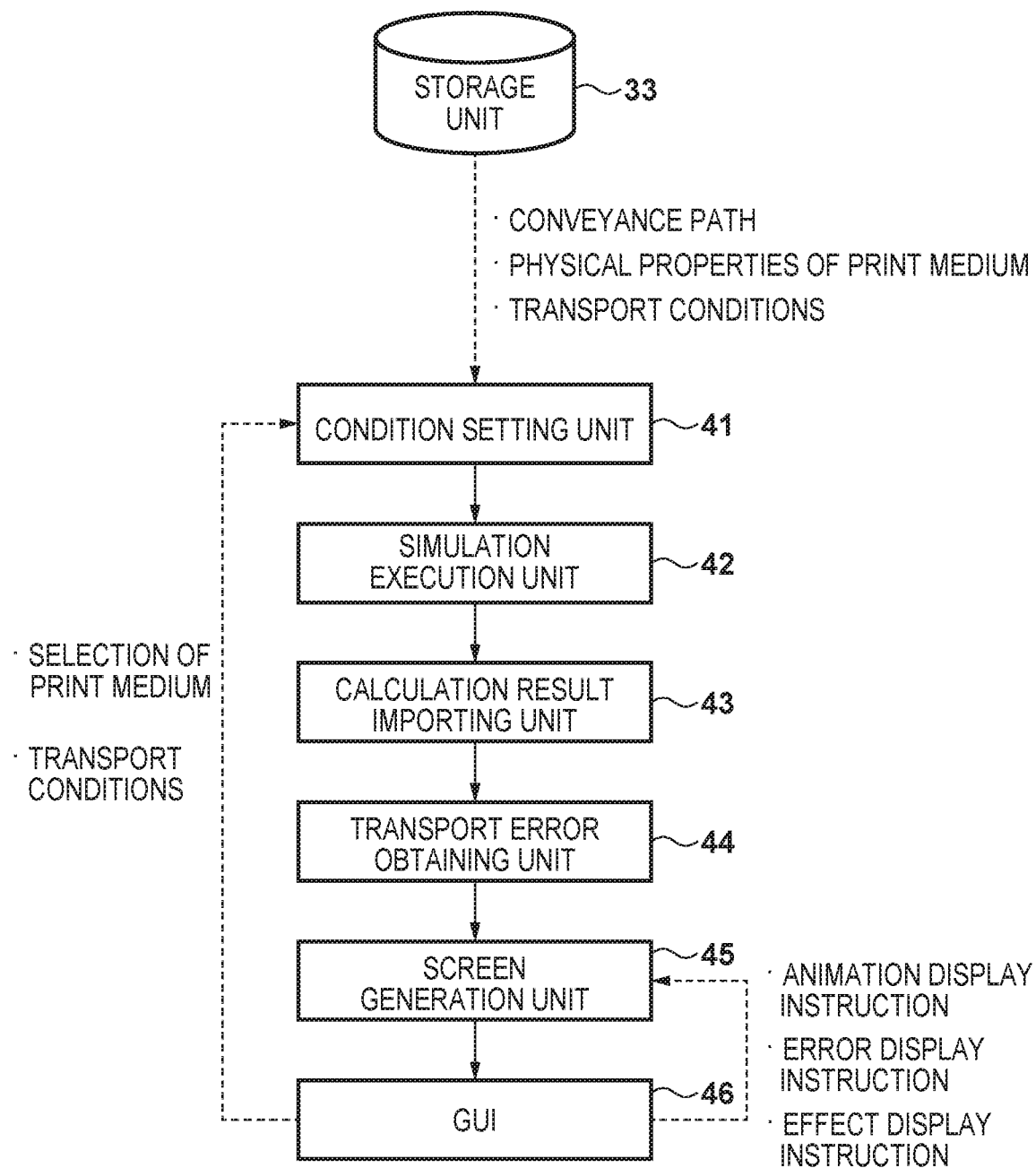
FIG. 4 is a block diagram for explaining the processing configuration of a design support program.

The processing configuration of the design support program will be described with reference to the block diagram of FIG. 4. A condition setting unit 41 performs definition of a conveyance path, definition of a print medium, and a series of preprocesses for transport conditions. A simulation execution unit 42 calculates the motion of the print medium according to the conditions set by the condition setting unit 41. A calculation result importing unit 43 imports a coordinate displacement or speed calculated by the simulation execution unit 42 as a simulation result.

A transport error obtaining unit 44 obtains information (transport error) representing the angle or horizontal deviation of the print medium fastened by the feed roller pair with respect to the shafts of the feed rollers arranged on the conveyance path. In other words, the transport error obtaining unit 44 obtains, from the simulation result, a tilt or displacement (transport error) of the print medium with respect to the orientation of the print medium transported on the conveyance path in an ideal transport state without disturbance.

A screen generation unit 45 generates a condition setting screen, an animation display screen that time-serially shows a simulation result, a geometric characteristic screen (to be described later) that time-serially graphically displays a transport error obtained by the transport error obtaining unit 44, and the like. The screens are displayed on a GUI 46 by the CPU 31.

In addition, the condition setting unit 41 can store set conditions in the storage unit 33. The calculation result importing unit 43 can store a simulation result in the storage unit 33. The transport error obtaining unit 44 can store a transport error in the storage unit 33. Hence, the simulation execution unit 42 can execute a simulation based on conditions obtained from the storage unit 33. The transport error obtaining unit 44 can obtain a transport error based on a simulation result obtained from the storage unit 33. Similarly, the screen generation unit 45 can generate the animation display screen or geometric characteristic screen based on a simulation result and a transport error obtained from the storage unit 33.

Condition Setting

Figure 5:
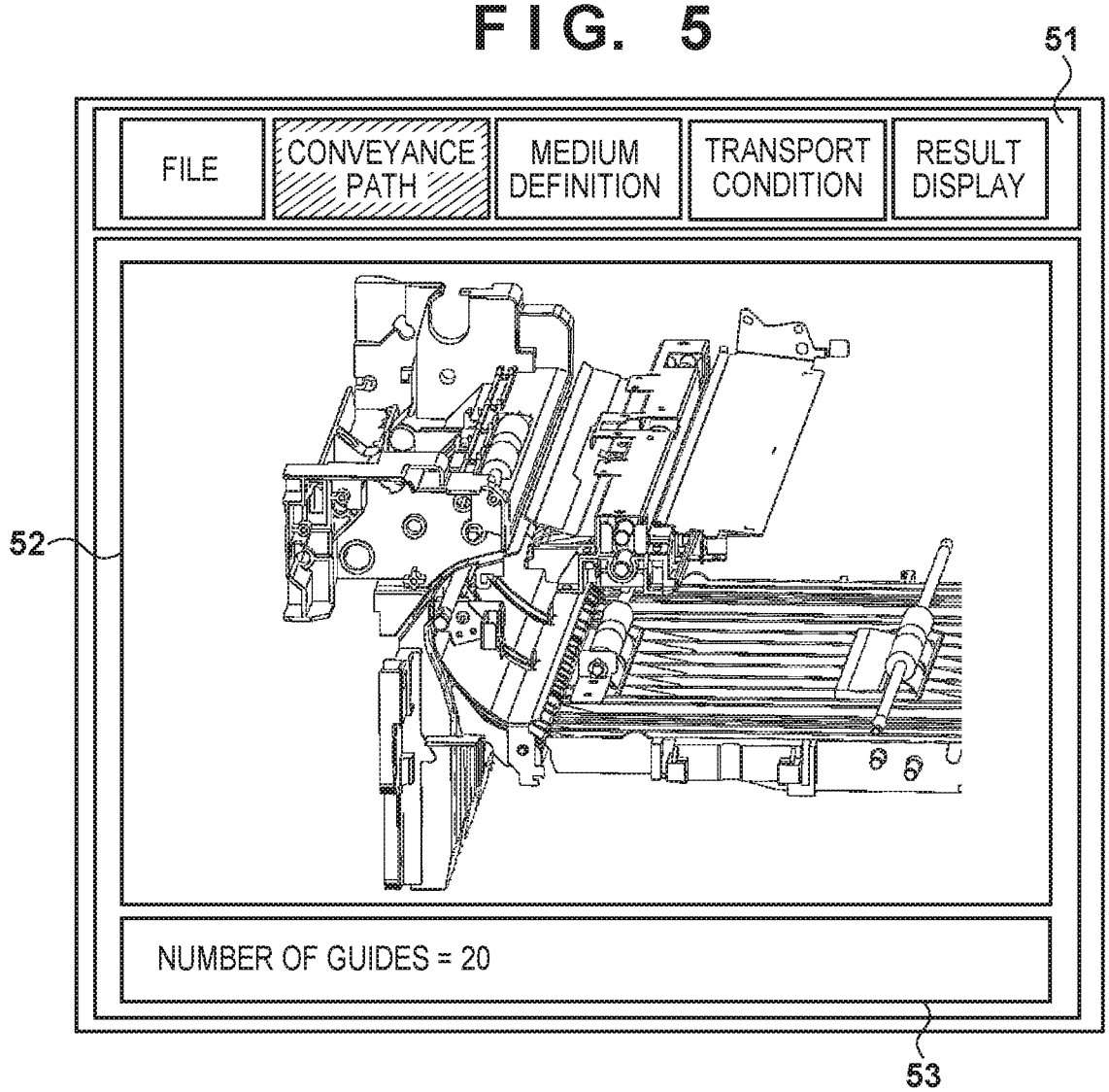
FIG. 5 is a view showing an example of a screen generated by a screen generation unit when executing a simulation.

FIG. 5 shows an example of a screen generated by the screen generation unit 45 when executing a simulation. The screen shown in FIG. 5 mainly includes a menu bar 51 used to switch the procedure, a graphic window 52 that displays a defined conveyance path or a result, and a command field 53 used to display a program message or cause the user to input a numerical value as needed. The graphic window 52 will sometimes be referred to as an "animation display screen" hereinafter. When the user presses various buttons of the menu bar 51, the sub-menu of each procedure is displayed. In addition, an initial time Ts, a calculation end time Te, and a time interval $\Delta t$ of a simulation are input using the command field 53.

A conveyance path is defined by importing external data. The user presses the "file" button of the menu bar 51 to instruct the CPU 31 to import 3D shape information from a 3D computer aided design apparatus (3D CAD) or the storage unit 33. The shape of a conveyance path represented by the imported 3D shape information is displayed on the animation display screen 52.

A print medium is defined by selecting a print medium. When the user presses a "medium definition" button of the menu bar 51, a registration dialog box for a print medium is displayed on the GUI 46. FIG. 6 shows an example of the registration dialog box for a print medium. The registration dialog box includes a selection box 61 in which the size of a print medium is selected, and a selection box 62 in which the type of a print medium is selected. FIG. 6 shows an example in which "A4" is selected as the size, and "print medium B" is selected as the type.

When the print medium is selected, the CPU 31 accesses a database stored in the storage unit 33 or the like, obtains print medium information representing physical property values such as a Young's modulus, thickness, and density of the selected print medium, and stores the print medium information in the RAM 35. Additionally, the CPU 31 divides the print medium into a plurality of elements of FEM to do modeling.

A transport condition is defined by importing external data or by user input. When the user presses a "transport condition" button of the menu bar 51, a setting dialog box for transport conditions is displayed on the GUI 46. FIG. 7 shows an example of the setting dialog box for transport conditions of a feed roller. The user inputs the drive start time, drive end time, and rotation speed of each feed roller corresponding to a roller number using the setting dialog box.

The minimum roller number is assigned to a feed roller located on the most upstream side of the defined conveyance path, and the maximum roller number is assigned to a print medium discharge roller or a feed roller located at the aftermost position of the return path for double-sided printing. Note that although not illustrated in FIG. 7, when an "import" button is provided in the setting dialog box, external data representing a transport condition can be imported from the storage unit 33 or the like.

Execution of Simulation

Motion calculation processing executed by the simulation execution unit 42 will be described next. The CPU 31 executes motion calculation of the print medium at the time interval $\Delta t$ from the initial time Ts to the calculation end time Te set by the condition setting unit 41.

Figure 8:
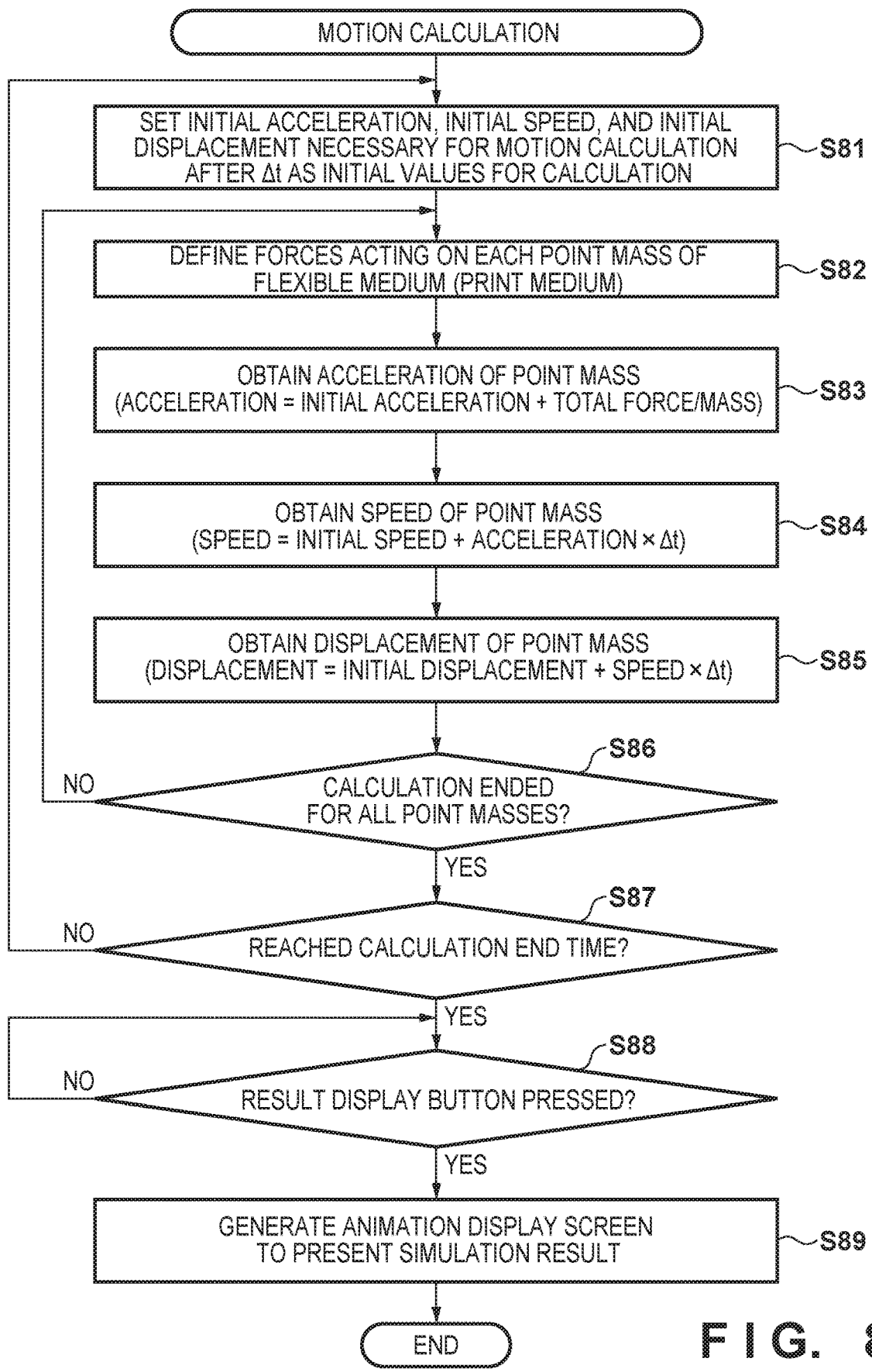
FIG. 8 is a flowchart for explaining a simulation of a motion of a print medium and display of a simulation result.

A simulation of a motion of a print medium and display of a simulation result will be described with reference to the flowchart of FIG. 8. First, the simulation execution unit 42 sets an initial acceleration, initial speed, and initial displacement necessary for motion calculation after $\Delta t$ as initial values for the calculation (S81). Every time one cycle of motion calculation ends, the calculation results are set as the values (that is, the calculated values of the preceding cycle are set as the initial values).

Next, the simulation execution unit 42 defines forces acting on each point mass of a flexible medium (print medium) (S82). The forces used for calculation are a rotation moment, a restoring force represented by a tensile force, a contact force, a frictional force, a gravity, an air resistance force, and a Coulomb force. The CPU 31 calculates the forces acting on each point mass, and after that, finally defines a resultant force thereof as a force acting on the flexible medium.

Next, the simulation execution unit 42 divides the total force acting on each point mass, which is obtained in step S82, by the mass of the point mass. The simulation execution unit 42 adds the initial acceleration to the division result, thereby obtaining the acceleration of the point mass after $\Delta t$ (S83). Then, the simulation execution unit 42 adds the initial speed to the multiplication result of the acceleration and $\Delta t$, thereby obtaining the speed of the point mass after $\Delta t$ (S84). Next, the simulation execution unit 42 adds the initial displacement to the multiplication result of the speed and $\Delta t$, thereby obtaining the displacement of the point mass after $\Delta t$ (S85).

In this embodiment, in steps S83 to S85, the Euler's time integration method is employed to do the series of calculations of the physical quantities after $\Delta t$. However, another time integration method such as the Kutta-Merson method, Newmark $\beta$ method, or Wilson $\theta$ method may be employed.

Next, the simulation execution unit 42 determines whether the calculations of steps S83 to S85 have ended for all point masses of the flexible medium (S86). If a material point that has not yet undergone the calculations remains, the process returns to step S82 to repeat the calculations of steps S83 to S85. If the calculations have ended for all point masses, the simulation execution unit 42 determines whether the calculation time has reached the calculation end time Te (S87). If the calculation time has not yet reached the calculation end time Te, the process returns to step S81 to repeat the processes of steps S81 to S86. If the calculation time has reached the calculation end time Te, the simulation execution unit 42 ends the motion calculation processing.

Output of Simulation Result

After the end of motion calculation processing, when the user presses the "simulation result display" button of the menu bar 51 shown in FIG. 5 (S88), the screen generation unit 45 generates the animation display screen 52 that presents the motion calculation result (simulation result) (S89).

Figure 9:
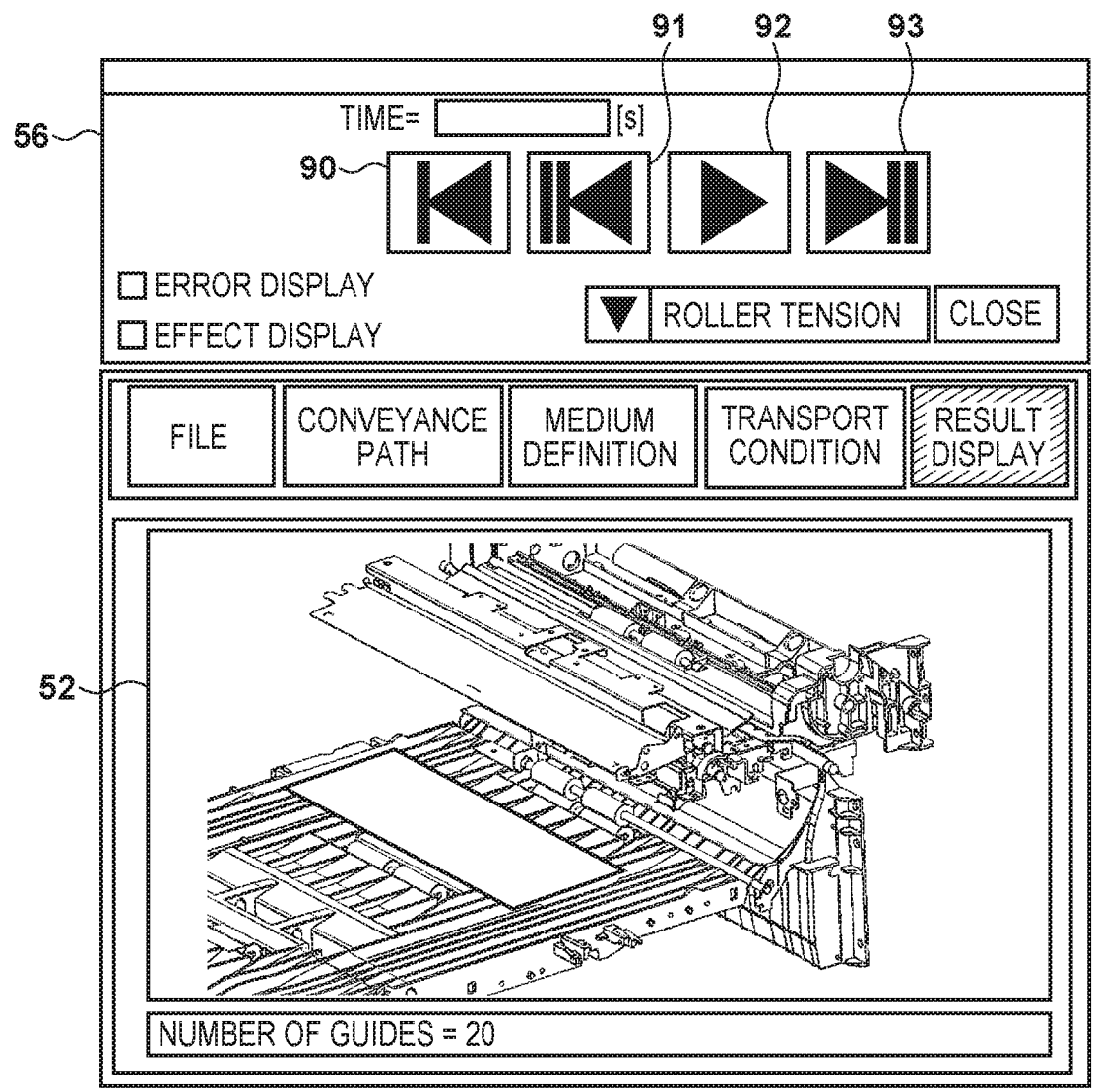
FIG. 9 is a view showing an example of a dialog box provided together with animation display.

FIG. 9 shows an example of a dialog box 56 provided together with the animation display screen 52. The user instructs to start and stop animation display at the time interval $\Delta t$ from the initial time Ts to the calculation end time Te by operating a play button 92 in the dialog box 56. The user also instructs to feed forward ($+\Delta t$) or back ($-\Delta t$) frames of animation display by operating frame feed buttons 91 and 93. The user also instructs to return to the initial step (initial time Ts) by operating a return button 90.

As described above, the user can cause the animation display screen 52 to display the behavior of the print medium as the calculation result at an arbitrary time at the time interval $\Delta t$ from the initial time Ts to the calculation end time Te by operating the buttons in the dialog box 56.

Obtaining of Transport Error

As described with reference to FIG. 1, the print medium deviates from the ideal transport state, for example, tilts halfway through transport. In the embodiment, the deviation (transport error) of the print medium from the ideal transport state is calculated using a tilt amount and a horizontal deviation amount based on each feed roller.

Calculation of a tilt amount will be described with reference to FIGS. 10A and 10B. As shown in FIG. 10A, the transport error obtaining unit 44 detects portions (finite elements indicated by solid-line rectangles) of the print medium fastened by a feed roller pair 101 and calculates the angle. FIG. 10B is an enlarged view of the transport unit. Both of FIGS. 10A and 10B illustrate a case in which the print medium is transported from the right to the left. FIG. 10B shows a case in which an angle $\phi$ that each side of the finite elements fastened by the transport unit (indicated by a broken-line rectangle) makes with respect to a direction perpendicular to an axis 102 (indicated by an alternate long and short dashed line) is calculated. The transport error obtaining unit 44 obtains the angle $\phi$ as a tilt amount generated at each contact point of the nip portion of each feed roller.

Figure 11:
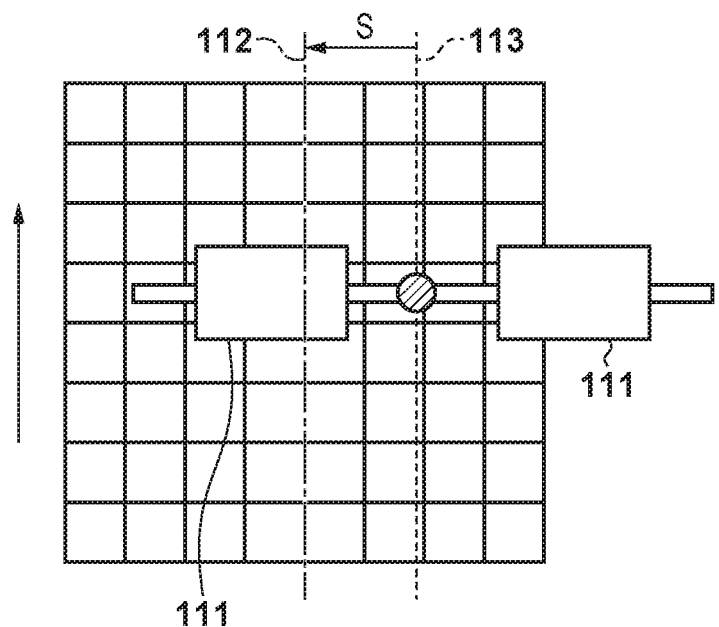
FIG. 11 is a view for explaining calculation of a horizontal deviation amount.

Calculation of a horizontal deviation amount will be described with reference to FIG. 11. FIG. 11 shows a case in which the print medium is transported from below to above. FIG. 11 shows an example in which a distance S between a center line 112 (indicated by an alternate long and short dashed line) of the print medium fastened by a feed roller pair 111 and a central position 113 (indicated by a broken line) of the feed roller pair 111 in the axial direction is calculated. The transport error obtaining unit 44 obtains the distance S as a horizontal deviation amount.

The transport error obtaining unit 44 further obtains the distance (to be referred to as a "tip length" hereinafter) to the tip of the print medium, the distance (to be referred to as a "rear-end length" hereinafter) to the rear end of the print medium, and a center tip length (to be described later) based on the feed rollers.

Figure 12:
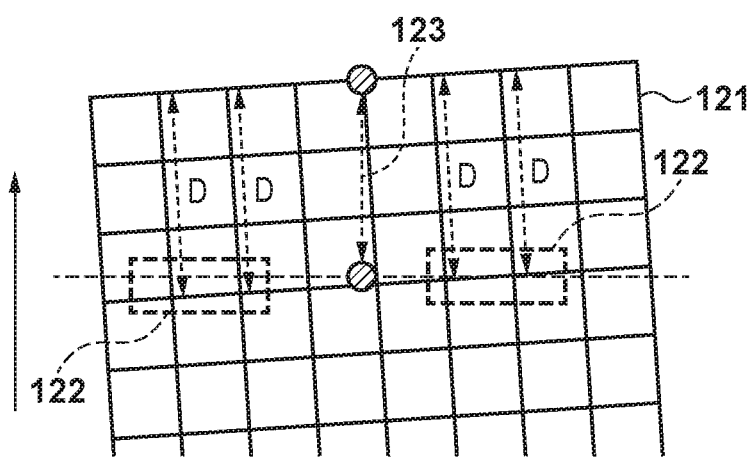
FIG. 12 is a view for explaining calculation of a tip length.

Calculation of the tip length will be described with reference to FIG. 12. FIG. 12 shows a case in which the print medium is transported from below to above. As shown in FIG. 12, a distance D (indicated by a broken-line arrow) from each contact point of finite elements 121 of the print medium fastened by a feed roller pair 122 to the tip of the print medium is calculated. The distance D is calculated at the "tip length" generated at each contact point of the nip portion of each feed roller. Simultaneously, the difference (L–D) between the tip length D and a length L of the print medium in the transport direction is calculated as the "rear-end length" generated at each contact point of the nip portion of each feed roller. That is, the distances between the portions of the print medium fastened by the feed roller pair 122 and the tip portion of the print medium located on the downstream side in the transport direction and the distances between the portions and the rear-end portion of the print medium located on the upstream side in the transport direction are obtained.

In addition, a distance 123 between a middle point (indicated by a full circle) on the line (a side of the print medium) of the tip of the print medium and a middle point (indicated by a full circle) on the axis of the feed roller pair 122 in a state in which the horizontal deviation amount S is eliminated is calculated as the "center tip length".

Geometric Characteristic Screen

The geometric characteristic screen generated by the screen generation unit 45 will be described with reference to FIG. 13. The geometric characteristic screen is a screen used to present the states of a tilt and horizontal deviation (geometric characteristics) of paper, and the like. When the user checks the "error display" check box in the dialog box 56 and instructs to start animation display, the screen generation unit 45 generates a graphic window 54 used to present a transport error in synchronism with presentation of a simulation result. The graphic window 54 corresponds to the "geometric characteristic screen" and will be referred to as a geometric characteristic screen hereinafter. Note that the function of an "effect display" check box shown in FIG. 13 will be described later.

Figure 14:
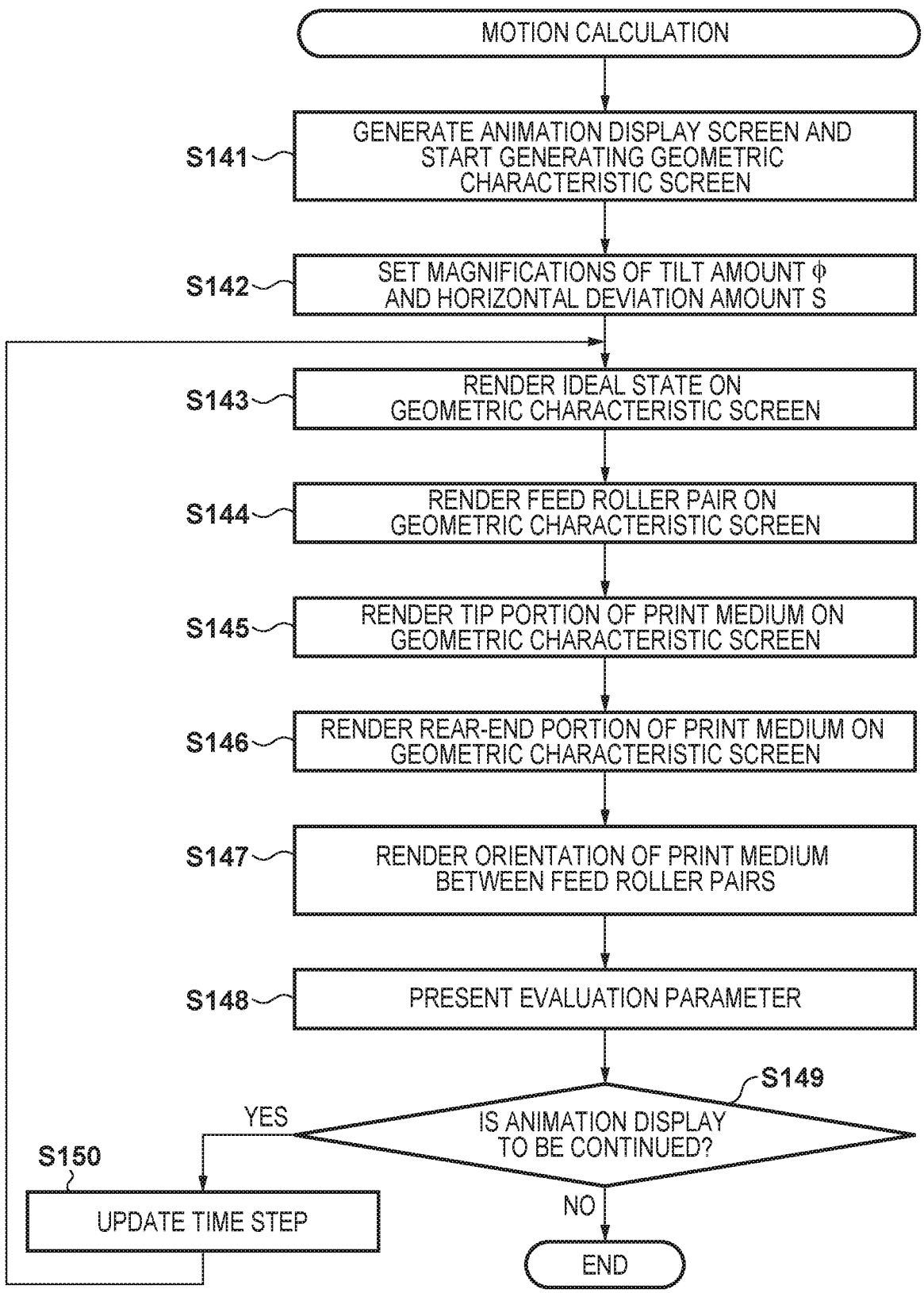
FIG. 14 is a flowchart for explaining generation processing of the geometric characteristic screen.

Generation processing of the geometric characteristic screen 54 will be described with reference to the flowchart of FIG. 14. In addition, rendering states of the geometric characteristic screen 54 will be described with reference to FIGS. 15A to 15D. When the start of animation display is instructed with a checkmark in the "error display" check box, the screen generation unit 45 generates the animation display screen 52 and starts generating the geometric characteristic screen 54 (S141). The magnifications of the tilt amount $\phi$ and the horizontal deviation amount S are set based on magnifications designated by the user (S142). Note that the magnifications are set to allow the user to easily recognize the tilt amount $\phi$ and the horizontal deviation amount S on the graphic display.

Figure 13:
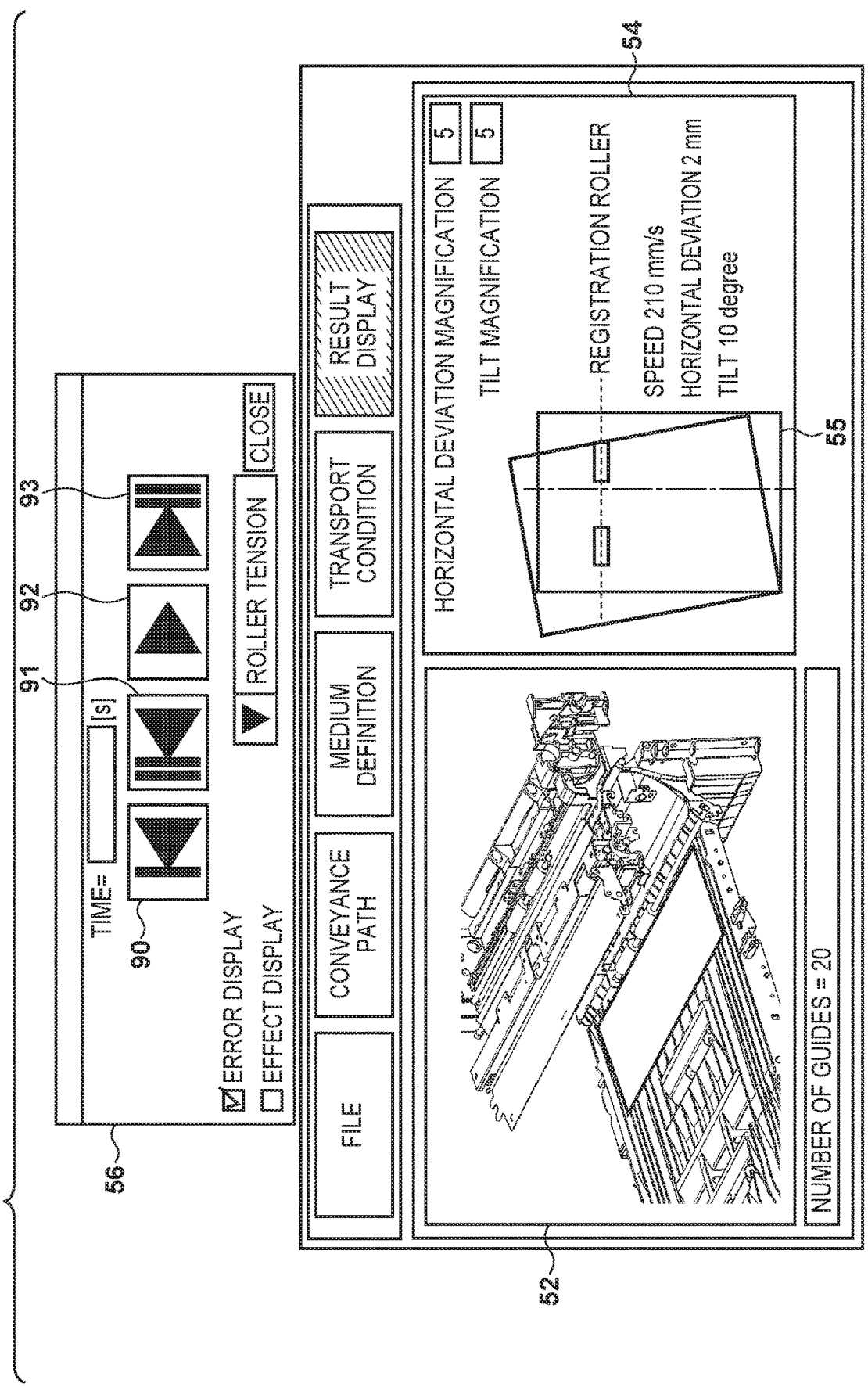
FIG. 13 is a view for explaining a geometric characteristic screen generated by the screen generation unit.
Figure 15:
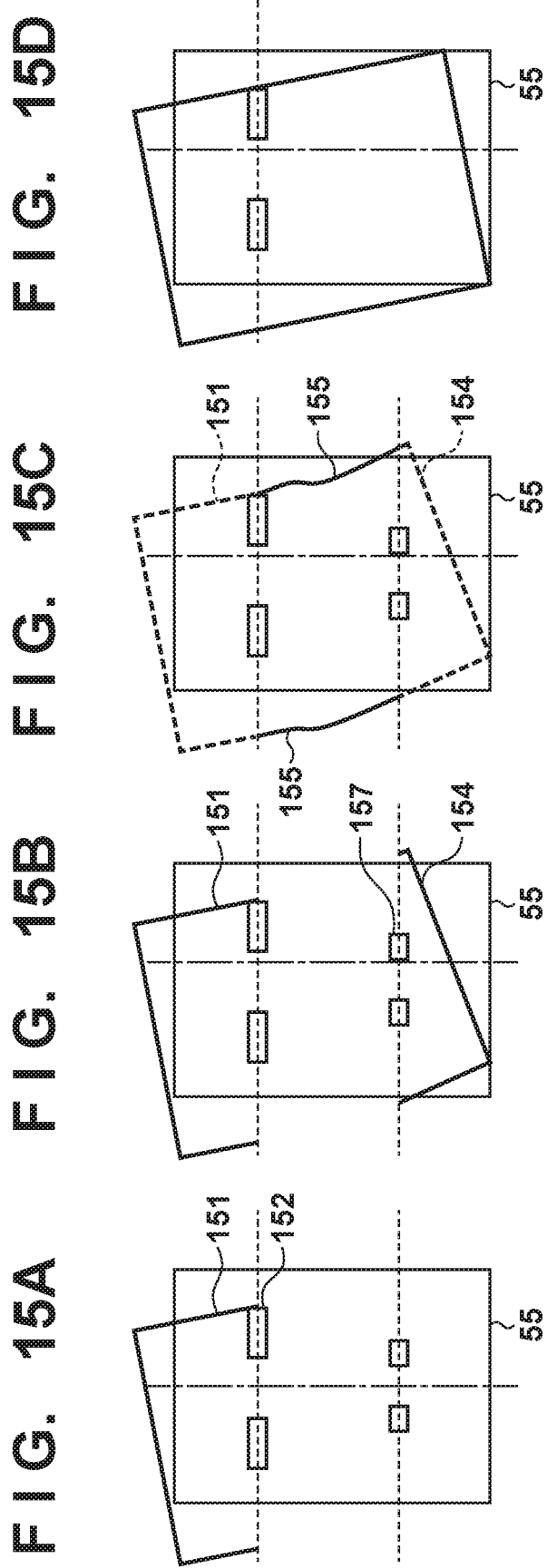
FIGS. 15A to 15D are views for explaining rendering states of the geometric characteristic screen.

Next, to comparatively present the transport error obtained from the ideal transport state and the simulation result, the screen generation unit 45 renders a rectangle 55 representing the print medium in the ideal transport state on the geometric characteristic screen 54, as shown in FIG. 13 (S143). The rectangle 55 will be referred to as an "ideal state" hereinafter. Then, based on the tip of the upper portion of the presented ideal state 55, the relative position of the feed roller pair is calculated from the center tip length 123 obtained by the transport error obtaining unit 44, and the feed roller pair is rendered on the geometric characteristic screen 54, as shown in FIG. 15A (S144).

Based on the tilt amount $\phi$ and the horizontal deviation amount S, the screen generation unit 45 calculates the position and tilt, in a direction (to be referred to as a "horizontal direction" hereinafter) perpendicular to the transport direction, of an end of the print medium at the position of a feed roller pair 152. Then, the screen generation unit 45 interpolates, by a line, the outer shape of a tip portion 151 of the print medium on the downstream side with respect to the feed roller pair 152 based on the tip length D, and renders the tip portion 151 on the geometric characteristic screen 54 (S145). FIG. 15A shows rendering to this point.

Next, based on the tilt amount $\phi$ and the horizontal deviation amount S at an upstream feed roller pair 157 out of the feed roller pairs, the screen generation unit 45 calculates the position and tilt, in the horizontal direction, of the end of the print medium at the position of the feed roller pair 157. The screen generation unit 45 interpolates, by a line, the outer shape of a read-end portion 154 of the print medium on the upstream side with respect to the feed roller pair 157 based on the rear-end length (L–D), and renders the read-end portion 154 on the geometric characteristic screen 54 (S146). FIG. 15B shows rendering to this point.

Next, the screen generation unit 45 calculates an interpolation curve (for example, an Hermitian interpolation curve) based on the tilt amount $\phi$ and the horizontal deviation amount S of the print medium in the horizontal direction at the position of each feed roller pair. The screen generation unit 45 then renders an orientation 155 of the print medium between the feed roller pairs by the interpolation curve (S147). FIG. 15C shows rendering to this point. However, if only one set of feed rollers exists on the print medium, step S147 is not executed, and the rendering state shown in FIG. 15D is obtained.

Next, the screen generation unit 45 presents evaluation parameters (roller name, speed, horizontal deviation amount, tilt amount, and the like) on the geometric characteristic screen 54, as shown in FIG. 13 (S148). The screen generation unit 45 determines whether to continue animation display, in other words, whether the time has reached the calculation end time Te or a time designated by the user (S149). To continue animation display, the screen generation unit 45 updates the time step (S150), and returns the process to step S144 to generate the geometric characteristic screen 54 after the time interval Δt.

In the way, detailed graphic display of the behavior of the print medium simultaneously fastened by a plurality of feed rollers in the complex conveyance path can be performed using the 2D geometric characteristic screen 54. It is therefore possible to numerically and intuitively grasp the states of the geometric characteristics (the tilt amount and the horizontal deviation amount) throughout the conveyance path, which cannot be evaluated only by simple animation display or the track of the print medium, and the factors thereof.

Presentation of Effect Parameter

When the "effect display" check box is checked, the screen generation unit 45 executes presentation of an effect parameter. When an effect parameter selected by the user is presented together with the geometric characteristics of the print medium, the influence of the effect parameter can more intuitively be evaluated.

Effect parameter presentation executed by the screen generation unit 45 will be described with reference to FIG. 16. The user checks both the "error display" check box and the "effect display" check box in the dialog box 56. In addition, the user selects an effect parameter and a display method thereof by a drop box, and instructs to start animation display. Selectable effect parameters and display methods thereof include the following physical quantities and display methods:

vector display of the tension distribution of the feed rollers, vector display of the transport speed distribution of the feed rollers, vector display of the principal stress of the print medium, and contour display of the contact force of the print medium.

Note that "tension" corresponds to the pressing force and tensile force applied from the print medium to the feed rollers, and "principal stress" indicates the states and directions of tension and compression of the print medium.

Figure 16:
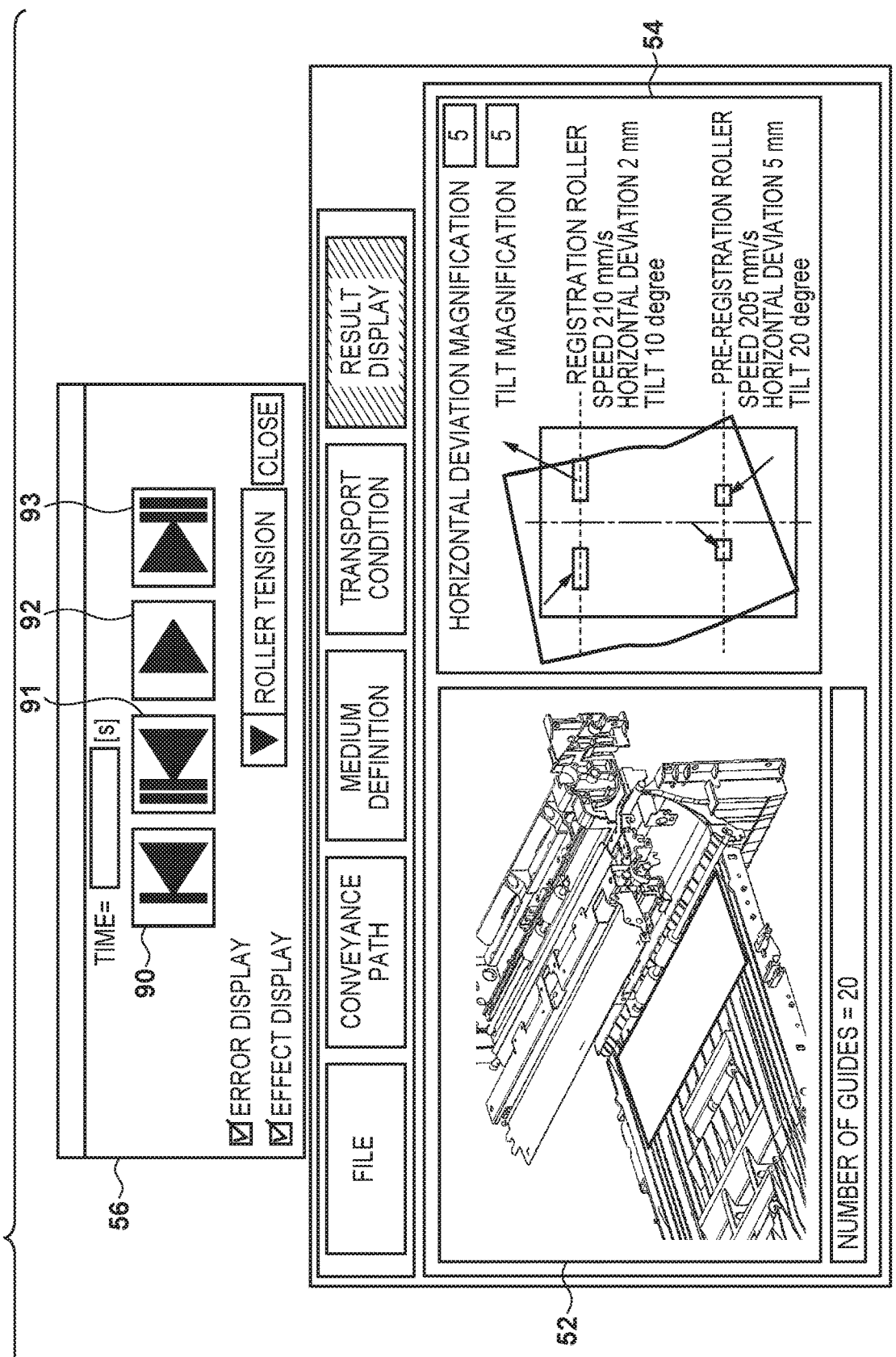
FIG. 16 is a view for explaining effect parameter presentation executed by the screen generation unit.

When the start of animation display is instructed, the screen generation unit 45 generates the geometric characteristic screen 54 in synchronism with the presentation of the simulation result on the animation display screen 52, and renders information (vectors or contours) representing physical quantities, as shown in FIG. 16. Note that FIG. 16 shows an example in which the physical quantities are displayed as vectors. However, the physical quantities may be displayed as contours.

When the effect parameter is presented, the user can grasp a roller load (affecting slip) by the toughness or tension of the print medium, and can intuitively evaluate how the effect parameter contributes to the variation in the print medium. When vector display of the transport speed distribution is selected as the effect parameter, the user can grasp changes in the transport direction and speed caused by the slip of the feed rollers and the tolerance of the feed rollers. When vector display of the principal stress of the print medium is selected as the effect parameter, the user can grasp the states and directions of tension and compression of the print medium. When contour display of the contact force of the print medium is selected as the effect parameter, the user can grasp the contact state of the print medium. That is, it is possible to intuitively evaluate how each effect parameter (physical quantity) contributes to the variation in the print medium and how it acts as a factor of a transport error.

Warning Message

Figure 17:
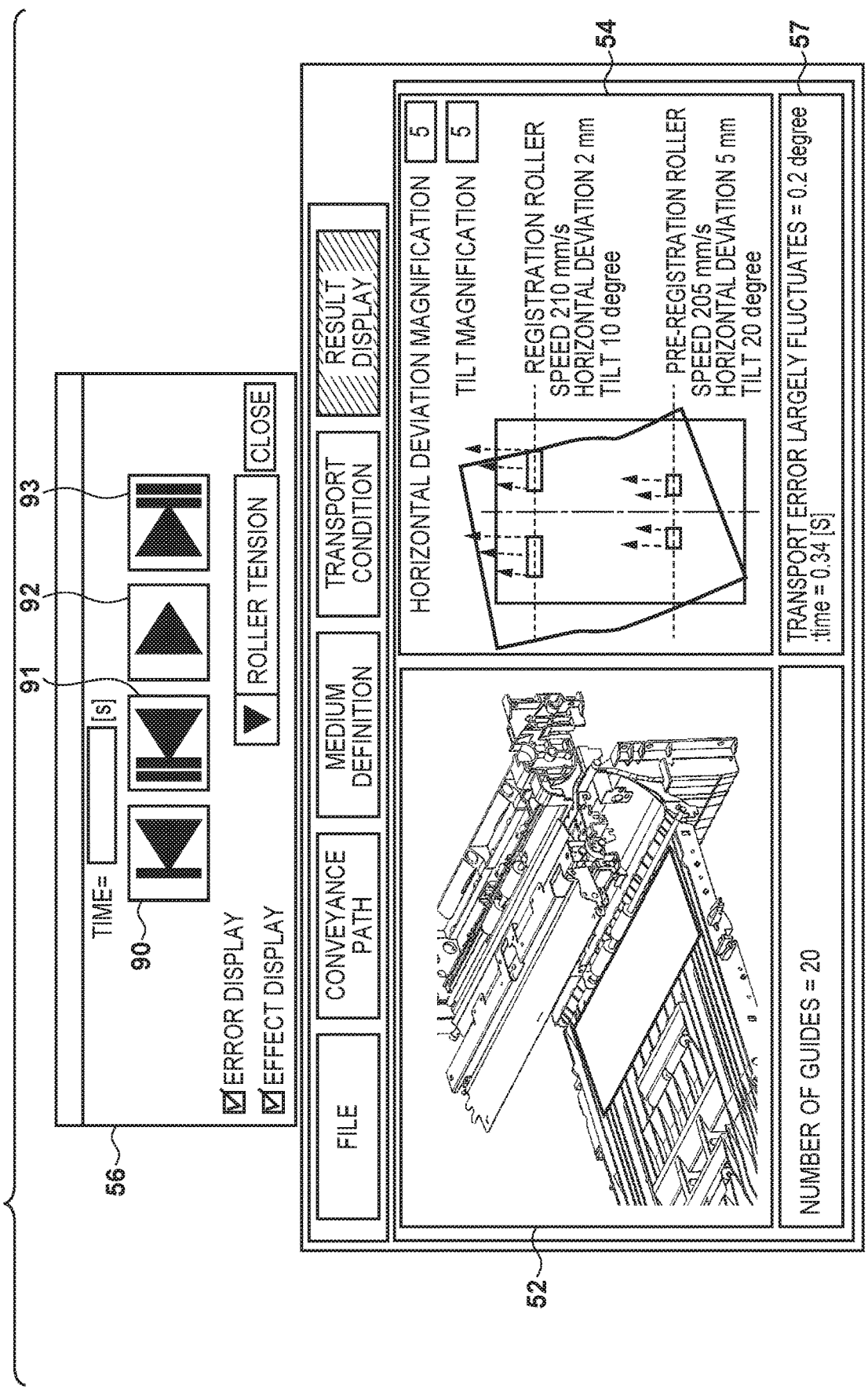
FIG. 17 is a view showing a display example of a warning message.

If the transport error exceeds a threshold or permissible amount preset by the user, the screen generation unit 45 can output a warning message to explicitly show the generation amounts and times of the tilt, horizontal deviation, and effect parameters of the print medium to the user. FIG. 17 shows a display example of the warning message. The screen generation unit 45 detects, for example, a large tilt of the print medium under animation display or a large difference generated between the tilt of the print medium with the tip portion fastened by the downstream feed rollers and the tilt that has occurred for the upstream feed rollers. The screen generation unit 45 then displays a warning message including the generation timing of the transport error in a message field 57.

FIG. 17 shows an example in which a warning message is displayed in synchronism with animation display at a timing when a tilt more than a tilt amount of, for example, 0.2° that is a permissible value for a product has occurred. The warning message allows the user to perceive a deviation from the permissible amount and determine whether the conveyance path design is appropriate. In addition, when the time at which the transport error largely fluctuates is extracted, the user can grasp the time or place to readily cause a deficiency during transport. Note that the warning message may be output to a window different from that shown in FIG. 17, or a voice message may be output.

In this way, the geometric characteristics (the tilt amount and the horizontal deviation amount) caused by skew from paper feed, a mutual tension (slip) between the feed rollers, the tolerance of the feed rollers, and the like can be reproduced, and information necessary to evaluate the conveyance path design can be provided. In addition, when a geometric shape generated in the print medium and the parameters that affect the geometric shape are presented, a place and a factor to cause a tilt or displacement of the print medium on the conveyance path from feed to discharge can intuitively be evaluated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-073213 filed Mar. 31, 2015 which is hereby incorporated by reference herein in its entirety.

What is claimed is:

1. A design support apparatus comprising:
at least one processor; and
one or more memories storing instructions that, when executed by the at least one processor, cause the design apparatus to:
perform a simulation of behavior of a recording medium which moves on a conveyance path of an image forming apparatus;
obtain a transport error of the recording medium based on a result of the simulation, wherein the transport error indicates a deviation between an orientation of the recording medium moving on the conveyance path in an ideal transport state in which there is no disturbance, and a simulated orientation of the recording medium;
generate a geometric characteristic screen to present the obtained transport error which is geometrically magnified by a magnification;
wherein the geometric characteristic screen is visualizing the deviation between an orientation of the recording medium moving on the conveyance path in the ideal transport state in which there is no disturbance, and a simulated orientation of the recording medium;
detect, based on the simulation result, a portion of the recording medium fastened between a feed roller pair disposed in the conveyance path, and obtain, as the transport error, a distance between a central position of an axis of the feed roller pair and a center line of the recording medium in the detected portion;
obtain a first distance between the detected portion and a tip portion of the recording medium located downstream of a transport direction, and obtain a second distance between the detected portion and a rear-end portion of the recording medium located upstream of the transport direction; and
render the recording medium and the feed roller hair fastening the recording medium in the ideal transport state based on the first and second distances, and render the simulated orientation of the recording medium based on the transport error so as to generate the geometric characteristic screen.

2. The design support apparatus according to claim 1, wherein the one or more memories further stores instructions that, when executed by the at least one processor, cause the design support apparatus to generate an animation display screen to present the simulation result.

3. The design support apparatus according to claim 2, wherein the animation display screen is configured to present the simulation result in time series, and the geometric characteristic screen is configured to present the transport error in synchronization with the presentation of the simulation result.

4. The design support apparatus according to claim 2, further comprising a display configured to display the animation display screen, or the animation display screen and the geometric characteristic screen.

5. The design support apparatus according to claim 1, wherein the one or more memories further stores instructions that, when executed by the at least one processor, cause the design support apparatus to:
detect, based on the simulation result, a portion of the recording medium fastened between a feed roller pair disposed in the conveyance path, and
obtain, as the transport error, a tilt amount of the recording medium in the detected portion with reference to an axis of the feed roller pair.

6. The design support apparatus according to claim 1, wherein the one or more memories further stores instructions that, when executed by the at least one processor, cause the design support apparatus to generate the geometric characteristic screen to which information indicating a physical quantity that is a factor of the transport error is rendered.

7. The design support apparatus according to claim 1, wherein the one or more memories further stores instructions that, when executed by the at least one processor, cause the design support apparatus to, in a case when the transport error exceeds a permissible amount or a threshold amount, output a message indicating an excess.

8. The design support apparatus according to claim 7, wherein the message contains information indicating a time when the transport error exceeds the permissible amount or the threshold amount.

9. The design support apparatus according to claim 8, wherein the magnification is designated by a user.

10. A design support method comprising:
using a processor to perform:
performing a simulation of behavior of a recording medium which moves on a conveyance path of an image forming apparatus;
obtaining a transport error of the recording medium based on a result of the simulation, wherein the transport error indicates a deviation between an orientation of the recording medium moving on the conveyance path in an ideal transport state in which there is no disturbance, and a simulated orientation of the recording medium;
generating a geometric characteristic screen to present the obtained transport error which is geometrically magnified by a magnification;
wherein the geometric characteristic screen is visualizing the deviation between an orientation of the recording medium moving on the conveyance path in the ideal transport state in which there is no disturbance, and a simulated orientation of the recording medium;
detecting, based on the simulation result, a portion of the recording medium fastened between a feed roller pair disposed in the conveyance path, and obtaining, as the transport error, a distance between a central position of an axis of the feed roller pair and a center line of the recording medium in the detected portion;
obtaining a first distance between the detected portion and a tip portion of the recording medium located downstream of a transport direction, and obtaining a second distance between the detected portion and a rear-end portion of the recording medium located upstream of the transport direction; and rendering the recording medium and the feed roller pair fastening the recording medium in the ideal transport state based on the first and second distances, and rendering the simulated orientation of the recording medium based on the transport error so as to generate the geometric characteristic screen.

11. A non-transitory computer readable medium storing a computer-executable program for causing a computer to perform a design support method, the method comprising:

performing a simulation of behavior of a recording medium which moves on a conveyance path of an image forming apparatus;

obtaining a transport error of the recoding medium based on a result of the simulation, wherein the transport error indicates a deviation between an orientation of the recording medium moving on the conveyance path in an ideal transport state in which there is no disturbance, and a simulated orientation of the recording medium;

generating a geometric characteristic screen to present the obtained transport error which is geometrically magnified by a magnification;

wherein the geometric characteristic screen is visualizing the deviation between an orientation of the recording medium moving on the conveyance path in the ideal transport state in which there is no disturbance, and a simulated orientation of the recording medium;

detecting, based on the simulation result, a portion of the recording medium fastened between a feed roller pair disposed in the conveyance path, and obtaining, as the transport error, a distance between a central position of an axis of the feed roller pair and a center line of the recording medium in the detected portion;

obtaining a first distance between the detected portion and a tip portion of the recording medium located downstream of a transport direction, and obtaining a second distance between the detected portion and a rear-end portion of the recording medium located upstream of the transport direction; and rendering the recording medium and the feed roller pair fastening the recording medium in the ideal transport state based on the first and second distances, and rendering the simulated orientation of the recording medium based on the transport error so as to generate the geometric characteristic screen.

\* \* \* \* \*